(12) United States Patent
Lin et al.

(10) Patent No.: US 8,296,503 B2
(45) Date of Patent: Oct. 23, 2012

(54) DATA UPDATING AND RECOVERING METHODS FOR A NON-VOLATILE MEMORY ARRAY

(75) Inventors: Tzu-chieh Lin, Hsinchu (TW); Chun-ying Chiang, Chiayi (TW); Li-chun Tu, Taipei (TW); Hong-ching Chen, Fang-Shan (TW); Kun-chieh Yang, Tainan (TW)

(73) Assignee: Mediatek Inc., Hsin-Chu (TW)

( * ) Notice: Subject to any disclaimer, the term of this patent is extended or adjusted under 35 U.S.C. 154(b) by 391 days.

(21) Appl. No.: 12/471,775

(22) Filed: May 26, 2009

(65) Prior Publication Data

US 2010/0306447 A1 Dec. 2, 2010

(51) Int. Cl.
*G06F 12/02* (2006.01)

(52) U.S. Cl. ........ 711/103; 711/202; 711/E12.001; 711/E12.008; 711/E12.016

(58) Field of Classification Search .......... None
See application file for complete search history.

(56) References Cited

U.S. PATENT DOCUMENTS

| | | | |
|---|---|---|---|
| 5,043,940 A | 8/1991 | Harari | |
| 5,172,338 A | 12/1992 | Mehrotra et al. | |
| 5,341,330 A | 8/1994 | Wells et al. | |
| 6,711,663 B2 * | 3/2004 | Lai et al. | 711/206 |
| 6,763,424 B2 | 7/2004 | Conley | |
| 6,968,421 B2 | 11/2005 | Conley | |
| 7,107,389 B2 | 9/2006 | Inagaki et al. | |
| 7,127,551 B2 | 10/2006 | Beck | |
| 7,139,864 B2 | 11/2006 | Bennett et al. | |
| 7,818,610 B2 | 10/2010 | Rogers et al. | |
| 2002/0188814 A1 * | 12/2002 | Saito et al. | 711/159 |
| 2003/0101327 A1 | 5/2003 | Beck | |
| 2005/0120266 A1 * | 6/2005 | Cernea | 714/8 |
| 2007/0016721 A1 | 1/2007 | Gay | |
| 2009/0198947 A1 | 8/2009 | Khmelnitsky et al. | |
| 2010/0138592 A1 | 6/2010 | Cheon | |
| 2011/0072189 A1 | 3/2011 | Post et al. | |
| 2011/0106804 A1 | 5/2011 | Keeler et al. | |
| 2011/0131231 A1 | 6/2011 | Haas et al. | |

FOREIGN PATENT DOCUMENTS

CN 1420440 5/2003

* cited by examiner

*Primary Examiner* — Denise Tran
(74) *Attorney, Agent, or Firm* — Kirton McConkie; Evan R. Witt

(57) ABSTRACT

Methods for updating and recovering user data of a non-volatile memory array such as a flash memory are disclosed. An indication for indicating a mapping relationship for a logical address is established when original user data of the logical addresses is updated into new user data. The indication records new pointers, which record the mapping relationships between logical addresses and physical addresses storing the new user data of the logical addresses. Alternatively, the indication records memory positions of the non-volatile memory array which are defined as designated memory positions and a sequence for using these designated memory positions.

5 Claims, 8 Drawing Sheets

DATA UPDATING AND RECOVERING METHODS FOR A NON-VOLATILE MEMORY ARRAY

TECHNICAL FIELD OF THE INVENTION

The present application relates to a non-volatile memory array, more particularly, to data updating and recovering for the non-volatile memory array such as a flash memory.

BACKGROUND OF THE INVENTION

A flash memory is a type of non-volatile memory arrays with advantages of low power consumption and small size. Therefore, flash memories are widely used in various applications, especially in portable electronic devices.

The flash memory is not overwritable. Once a portion of the flash memory is written with data, the existing data must be deleted (i.e. erased) first, then the portion can be rewritten with new data. The flash memory is composed of transistor cells. Those transistor cells are grouped into erasable blocks. The cells of one block are erasable at one time. That is, the block is a unit of data erase for the flash memory. Each block is further divided into multiple pages. The page is a unit of data programming. Typically, each page is used to store one sector of user data. However, it is possible that one page stores a portion of one sector or several sectors of user data. The sector is a unit of data transfer.

FIG. 1 is a schematic illustration showing an example of a data structure for a page 100 of the flash memory. As shown, the page 100 has a data region 110 and a spare region 120. The data region 110 is typically used for storing user data. The spare region 120 is used to store some control data such as a logical address, which is referred to as LBA 122, and a time stamp 124 for recording the time when the data is written to the data region 110, for example. The spare region 120 can also contain other information such as an error correction code (ECC).

As mentioned, the unit for programming data is a page, while the unit for erasing data is a block. When the data of a logical page, which is originally stored in a physical page, is to be updated, a usual method is to find another physical page and write new data into the new physical page. The mapping relationships between the logical page and the original and new physical pages are both recorded. FIG. 2 shows a schematic illustration of a pointer table 200. The pointer table 200 records the mapping relationships between respective logical addresses and corresponding physical addresses of the flash memory with pointers. The logical addresses can be identified by an operating system (e.g. Windows) of a computer, and the physical addresses represent the specific positions in the flash memory. For example, a first pointer 201 indicates that a logical address LBA1 corresponds to a physical address PA1, and a second pointer 202 indicates that a logical address LBA2 corresponds to a physical address PA2. That is, the data of the logical address LBA1 is stored in a position in the flash memory denoted by the physical address PA1, and the data of the logical address LBA2 is stored in a position in the flash memory denoted by the physical address PA2. When the data of the physical address PA1 corresponding to the logical address LBA1 is updated, the new data is written to a new physical address PA3, for example. Then, an additional pointer (not shown) indicating a new mapping relationship between the logical address LBA1 and the physical address PA3 will also be recorded in the pointer table 200. As can be understood, the point table 200 is of a great size since all mapping relationships for the respective logical addresses are recorded therein. For example, if the logical address LBA1 is rewritten 100 times, the mapping relationship will be updated 100 times. Accordingly, 100 pointers recording the mapping relationships between the logical address and the 100 different physical addresses will be recorded in the pointer table 200. The pointer table 200 is usually stored in a specific area of the flash memory.

When a system using the flash memory is activated, the pointer table 200 is read and written to a volatile memory such as a dynamic random access memory (DRAM) or static random access memory (SRAM). By scanning the pointer table 200, it can be known that which one of the positions of the flash memory stores the user data of a specific logical address. For example, the memory position storing the latest data for a specific logical address can be known by checking the time stamps if there are a plurality of records of this specific logical address.

When segments of the user data are updated, the pointer table 200 also needs to be updated. However, the point table is very huge if the flash memory is a high capacity memory array (e.g. 1 tera bytes). It will take a very long period of time to update the point table 200. Accordingly, the efficiency of the whole system will be degraded if the point table 200 stored in the flash memory is updated whenever any data segment is updated.

SUMMARY OF THE INVENTION

The present invention is to provide methods for updating and recovering user data of a non-volatile memory array such as a flash memory. By using the methods of the present invention, the usage efficiency and recovery speed of the flash memory can be significantly promoted.

In accordance with an aspect of the present invention, a method for updating user data is disclosed. The user data is associated with a plurality of logical addresses and a plurality of physical addresses of a non-volatile memory array. A pointer table recording a plurality of mapping relationships between the logical addresses and the physical addresses is stored in the non-volatile memory. The method comprises writing new user data for a logical address to a memory position in the non-volatile memory array when original user data of the logical address is to be updated into the new user data, wherein the memory position is denoted by a new physical address; and establishing an indication other than the point table, the indication indicating a mapping relationship between the logical address and the new physical address.

In the user data is updated by the above method, to recover the user data of the logical addresses after a power failure occurs, a recover method comprises reading the pointer table from the non-volatile memory array; reading the indication, determining a valid mapping relationship between the logical addresses and the corresponding physical address according to the indication and the pointer table, the indication being considered in priority; and reading the new user data from the memory position denoted by the new physical address according to the valid mapping relationship for the logical address.

In accordance with another aspect of the present invention, another method for updating user data is disclosed. The method comprising establishing an indication about a plurality of memory positions of the non-volatile memory array defined as designated memory positions, and the indication indicating a predetermined sequence for using the designated memory positions; and writing new user data of one of the logical addresses into one of the designated memory positions according to the indication when original user data of the logical address is to be updated into the new user data.

In the user data is updated by the above method, to recover the user data of the logical addresses after a power failure occurs, a recover method comprises reading the pointer table from the non-volatile memory array; reading an indication; scanning the designated memory positions according to the indication; and reading the new user data for the logical address from the designated memory position.

DETAILED DESCRIPTION OF THE INVENTION

Figure 1:
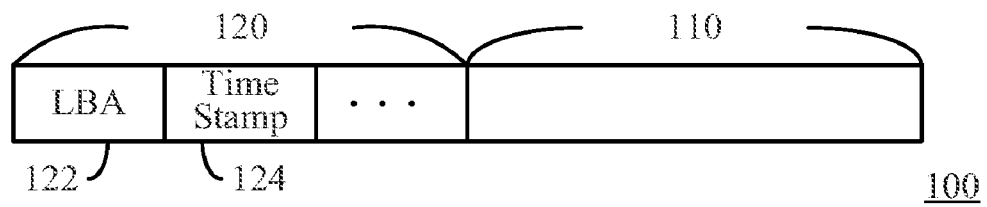
FIG. 1 is a schematic illustration showing an example of a data structure for a page of a flash memory.
Figure 2:
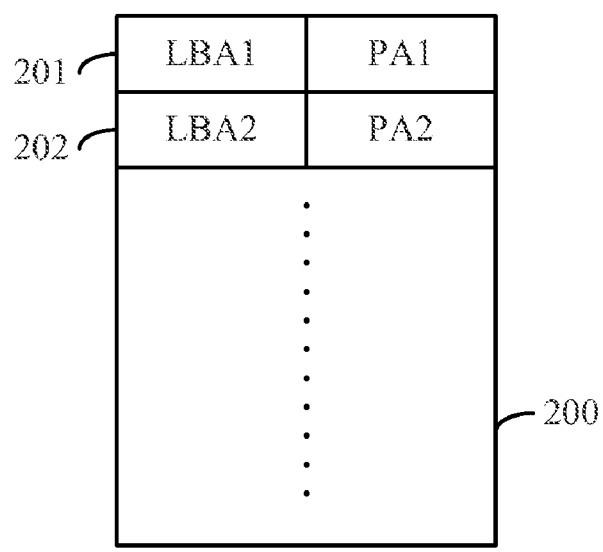
FIG. 2 is a schematic illustration showing a pointer table for recording mapping relationships of logical addresses and physical addresses of the flash memory.
Figure 3A:
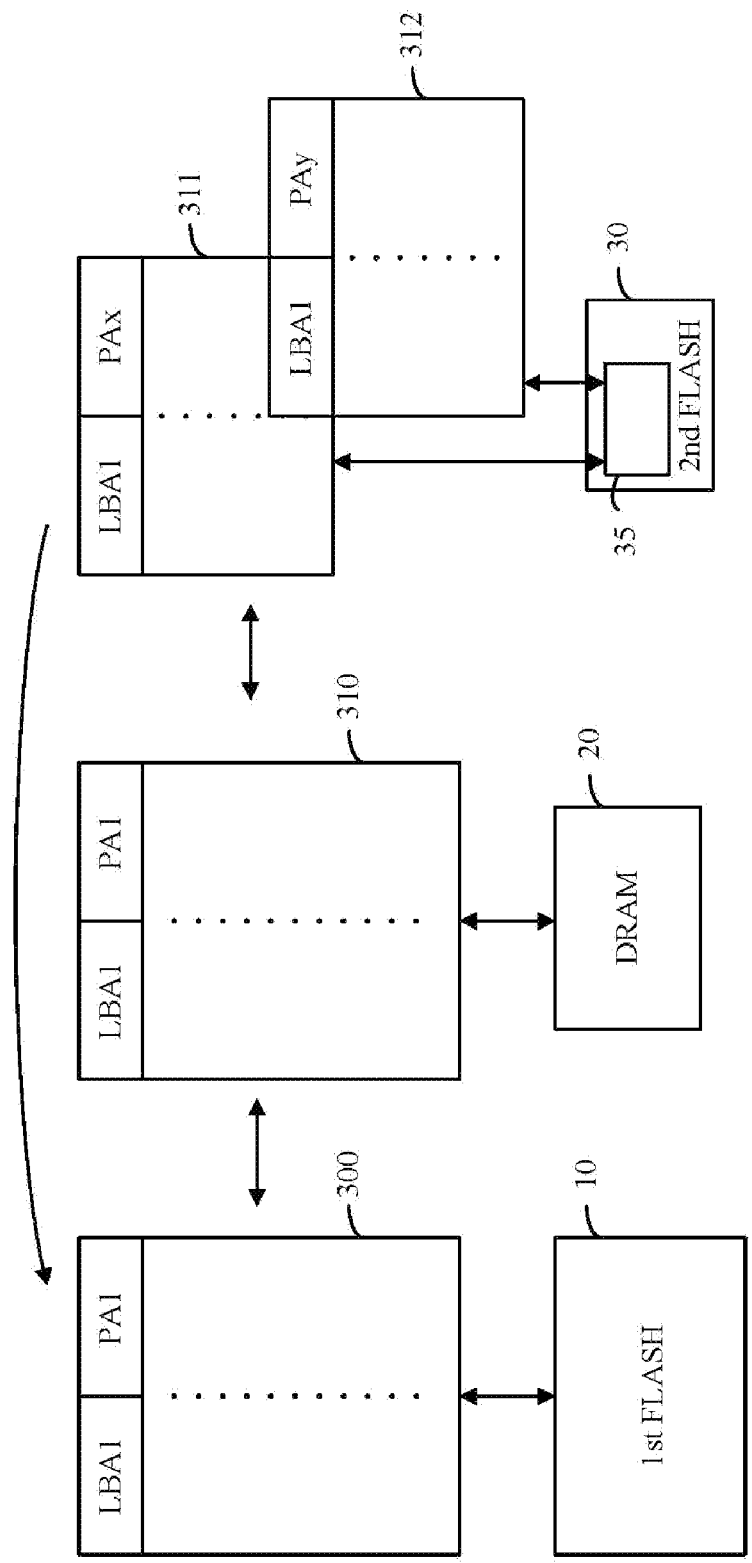
FIGS. 3A and 3B are schematic illustrations showing the concept of a first embodiment of the present invention.
Figure 3B:
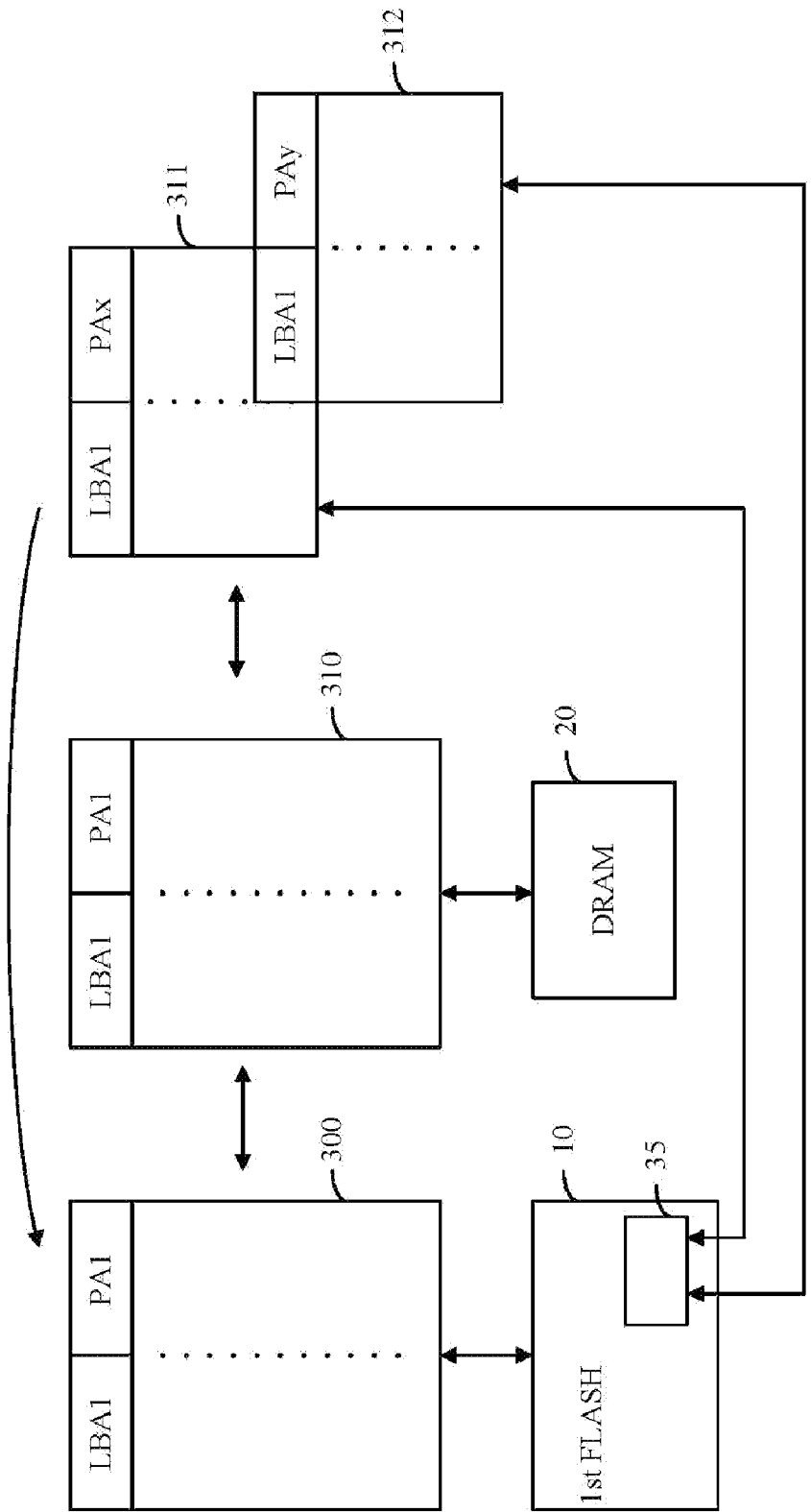
Figure 4:
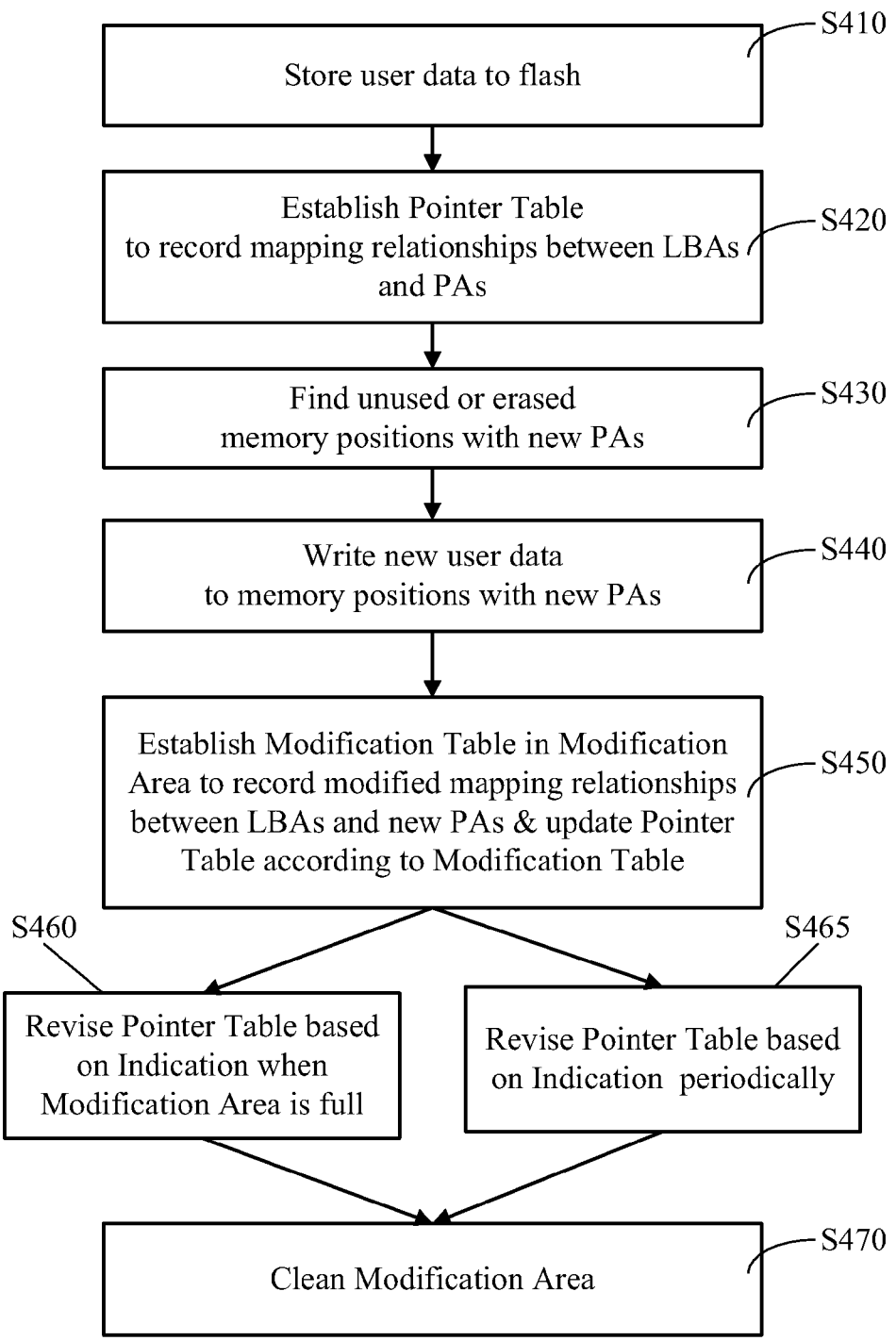
FIG. 4 is a flow chart of an updating method in accordance with the first embodiment of the present invention.

Now a first embodiment of the present invention will be described with reference to FIGS. 3A, 3B and 4, in which FIGS. 3A and 3B are schematic illustrations showing the concept of the first embodiment of the present invention and FIG. 4 is a flow chart of an updating method in accordance with the first embodiment of the present invention. In step S410, user data of logical addresses are stored in positions of a first flash memory 10 of a system (not shown). The positions of the first memory (or referred to memory positions) are respectively denoted by physical addresses (PAs). Each logical address (LBA) is corresponding to a physical address (PA). A pointer table 300 is established for the first flash memory 10 in step S420. Generally, the pointer table 300 is stored in the first flash memory 10 and also written into a volatile memory such as a DRAM 20. For the sake of description, the point table stored in the first flash memory 10 is referred to as a first point table 300, and the point table written in the DRAM 20 is referred to as a second point table 310. A copy of the second point table 310 is written back to the first flash memory 10 for updating the first point table 300 when system power is turned off. In the pointer tables 300, 310, each pointer records a mapping relationship between a logical address (LBA) and a physical address (PA) of the first flash memory 10. As shown, the first pointer of the pointer table 300 or 310 indicates a logical address LBA1 maps to a physical address PA1. It means that user data associated with the logical address LBA1 is stored in a position of the flash memory denoted by the physical address PA1. The physical address may include a block number and a page number, for example.

When the system is powered on, the first pointer table 300 in the first flash memory 10 is loaded to the DRAM 20 to generate the second point table 310. Before the system is powered off, the second pointer table 310 in the DRAM 20 is written back to the first flash memory 10 to update the first point table 300.

In the present embodiment, when an update for user data occurs, the system finds usable memory position(s) of the first flash memory 10 in step S430. The system stores new user data to the memory position(s) in step S440. The second pointer table 310 in the DRAM 20 is updated, while the first pointer table 300 in the first flash memory 10 is not updated. In addition, an indication, which is referred to as a modification table (e.g. modification table 311 or 312 of FIGS. 3A and 3B) herein, is established to record modified mapping relationships between LBAs and new PAs in step S450. Preferably, the modification table is stored in a specific area or the whole area of a small memory array other than the first flash memory 10. For example, the modification tables 311, 312 shown in FIG. 3A are stored in a second flash memory 30. It is also possible that the modification table is stored in a specific area of the first flash memory 10 as shown in FIG. 3B. The specific area used to store the modification table is referred to as a modification area 35 in the present invention as shown in FIG. 3A or FIG. 3B.

The establishment of the modification table means recording new pointers indicating new mapping relationship between the logical addresses and new corresponding physical addresses. In the present embodiment, the new user data for the logical address is written to a new position denoted by the new physical address first, and then the new pointer thereof is written to the modification table. However, it is possible to write the new pointer indicating the mapping relationship between the logical address and the new physical address to the modification table first, and then write the new user data to the new position denoted by the new physical address. Further, it is also possible to write the new pointer and the new user data in parallel. Therefore, there is no specific sequence between the steps S440 and S450. Similarly, there is no specific sequence between the steps S410 and S420.

As described, the modification table records revisal(s) of the mapping relationship between each logical address being subject to update and the corresponding new physical address. Preferably, whenever one update procedure occurs, a new modification table is established. In the update procedure, the user data of one or more logical addresses are updated. It is assumed that the logical address LBA1 originally maps to the physical address PA1. The logical address LBA1 is changed to map to a new physical address PAx in a first update procedure, and is changed to map to another new physical address PAy in a second update procedure. As shown in FIG. 3, in the first update procedure, a first modification table 311 is established. In the first modification table 311, the logical address LBA1 maps to the physical address PAx. In the second update procedure, a second modification table 312 is established, in which the logical address LBA1 maps to the physical address PAy. If the physical address PA1 denotes a specific physical page of a specific physical block of the flash memory, each of the physical addresses PAx and PAy can be an unused or erased page in the same block as PA1 or a page in another block different from PA1.

In one update procedure, all updated mapping relationships for the updated logical addresses are recorded in the same modification table. If one logical address, say LBA2, is not updated in this update procedure, that is, the mapping relationship for the logical address LBA2 is not revised, then no record for the logical address LBA2 will be made in the modification table of this update procedure.

It is noted that the respective modification tables are logically defined. In practice, it is preferred that the new pointers of the respective updates are recorded sequentially. That is, the respective modification tables for the respective updates are stored in sequence. However, any other arrangement for storing the update pointers is also possible as long as the last one of the update pointers for each logical address can be known.

In the present embodiment, the modification area 35 with a predetermined capacity is allocated in the second flash memory 30 to store the modification tables as shown in FIG. 3A. The second flash memory 30 is a small capacity flash memory. However, as mentioned above, it is possible to allocate the modification area 35 in a specific area of the first flash memory 10 as shown in FIG. 3B.

When the modification area 35 is full, the first pointer table 300 is revised to be a new pointer table according to the modification tables 311, 312 stored in the modification area 35 (Step S460). Then, the existing modification tables 311, 312 can be invalidated. For example, the modification tables 311, 312 stored in the modification area 35 are cleaned (i.e. erased) in step S470. Accordingly, the modification area 35 can be used to store new modification tables (i.e. to store new pointers). Alternatively, the first pointer table 300 is revised to be a new pointer table based on the modification tables periodically (step S465). For example, whenever a predetermined period of time has elapsed, the modification tables are deemed as expired, the first pointer table 300 is revised to be a new one according to the existing modification tables (e.g. the modification tables 311, 312), and then the modification tables are invalidated. As mentioned, the second pointer table 310 is revised whenever there is an update. Therefore, the second pointer table 310 always records the latest mapping relationships between the logical addresses and the physical addresses.

In the present embodiment, because of the existence of the modification tables, the first pointer table 300 needs not to be revised frequently. That is, by using such a method, update times for the first pointer table 300 can be significantly reduced. As a result, processing time for updating the first pointer table 300 can be considerable saved as compared to the conventional scheme. In addition, because of the existence of the modification tables, the data can be easily recovered when a power failure occurs even if the first point table 300 in the first flash memory 10 has not been updated timely. As described, the second pointer table 310 is revised whenever there is an update, while the first pointer table 300 is not revised so frequently. However, the new mapping relationships between the logical addresses and the new physical addresses generated in the updates are recorded in the modification tables. When the system is re-powered on, the system may check if there is any modification table. If so, the old first pointer table 300 in the first flash memory 10 is revised by the modification table, and is written to the DRAM 20 to generate a second pointer table 310 in the DRAM 20.

Figure 5:
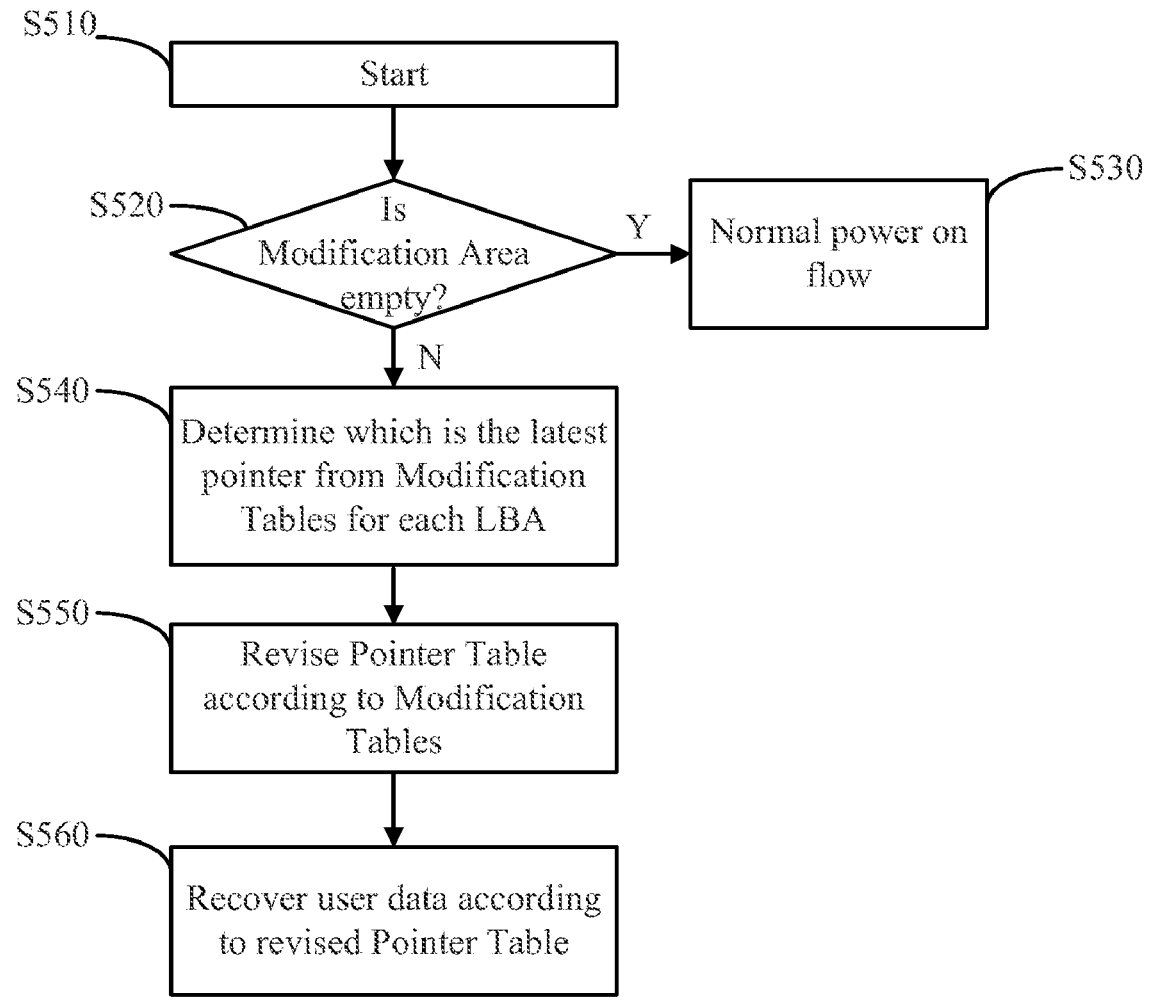
FIG. 5 is a flow chart of a recovering method in accordance with the first embodiment of the present invention.

FIG. 5 is a flow chart of a recovery method in accordance with the first embodiment of the present invention. As described, the modification tables 311, 312 are stored in the modification area 35. That is, the new pointers indicating the mapping relationships between the logical addresses and the corresponding new physical addresses are stored in the modification area 35. When a power failure occurs, the second pointer table 310 stored in DRAM 20 will be lost. As described, the second pointer table 310 is revised whenever there is an update, while the first pointer table 300 is not revised so frequently. However, the new mapping relationships between the logical addresses and the new physical addresses for the updates are recorded in the modification tables 311, 312. Accordingly, the latest relationships between the logical addresses and the physical addresses can be known.

The recovery process started at step S510. When the system is re-powered, to recover the user data, the system may check if there is any modification table. That is, the system determines whether the modification area is empty (step S520). If the modification area 35 is empty, it means that no update has been made before the power failure, then the process goes to step S530 to proceed a normal power on flow. That is, the system reads the first pointer table 300 to store in the second pointer table 310. If the modification area 35 is not empty, it means that there has been at least one update before the power failure. The process then goes to step S540.

In step S540, the system determines which is the latest pointer for each logical address. In the example shown in FIG. 3A or FIG. 3B, the latest pointer for the logical address LBA1 indicates that the latest corresponding physical address is PAy. In step S550, the first pointer table 300 is written to the DRAM 20 to generate a new pointer table 310. The pointer table 310 is revised according to the modification tables 311, 312 stored in the second flash memory. In practice, when the system is activated, the first pointer table 300 may be read and written into the DRAM 20 to generate the second pointer table 310 first, and then the system checks the modification area 35. The second pointer table 310 is revised according to the latest pointer for each logical address listed in the modification tables 311, 312. If the new pointers are recorded in sequence, then the last one pointer stored in the modification area for a specific logical address is the latest pointer thereof. Finally, the user data can be read according to the revised pointer table (step S560).

Figure 7:
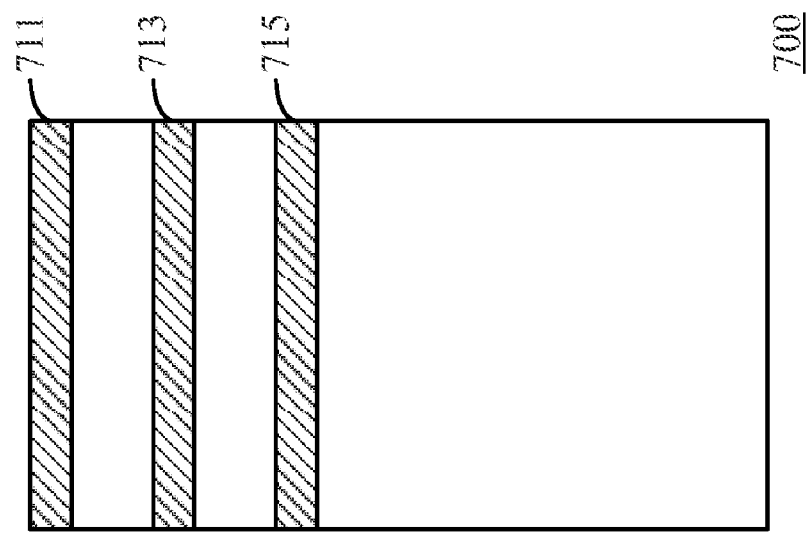
FIG. 7 is a schematic diagram showing another example of the flash memory arrangement in accordance the with second embodiment of the present invention.
Figure 6:
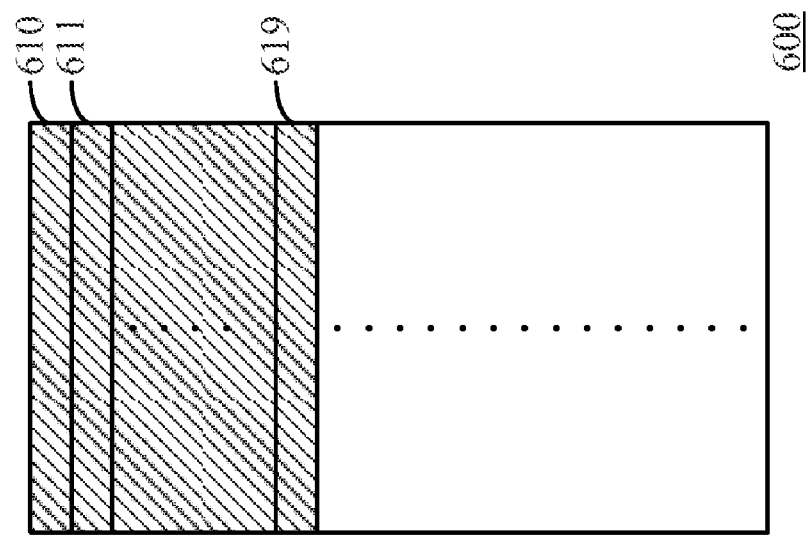
FIG. 6 is a schematic diagram showing an example of the flash memory arrangement in accordance with a second embodiment of the present invention.

FIGS. 6 and 7 show two examples of the flash memory arrangement in accordance with a second embodiment of the present invention. In the present embodiment, a chosen area or chosen areas of a first flash memory are designated to store updated user data. In one example, successive memory physical blocks as a whole are designated as an update area to store updated user data. As shown in FIG. 6, the first twenty blocks including the first block 610 to the twentieth block 619 of the first flash memory 600 are assigned as designated memory positions to store updated user data. If the user data of any logical address is updated, new user data of the logical address is always stored to a position in the update area (e.g. the blocks 610 to 619). The new user data of plural updates are stored in the positions of the update area in a specific sequence. In another example, discrete areas of a first flash memory 700 are assigned as update areas to store updated user data. As shown in FIG. 7, the first block 711, the third block 713, the fifth block 715 . . . of the first flash memory 700 are designated as designated memory positions to store the updated user data. In addition to these two examples above, other designation manners for the designated memory positions are also possible. For example, a portion of pages of a block can also be assigned to be the designated memory positions. In conclusion, some memory positions of the flash memory are designated. These designated memory positions are used to store the updated user data during update procedures.

In the present embodiment, an indication for directing the system how to store the updated user data into the update area(s) is established. The indication can be stored in a second flash memory (not shown). The second flash memory is dedicated to store the indication. Therefore, the second flash memory can be implemented by a small flash memory. Alternatively, the indication can be stored in a modification area of the first flash memory. In the former case, the whole second flash memory can be deemed as a modification area.

Figure 8:
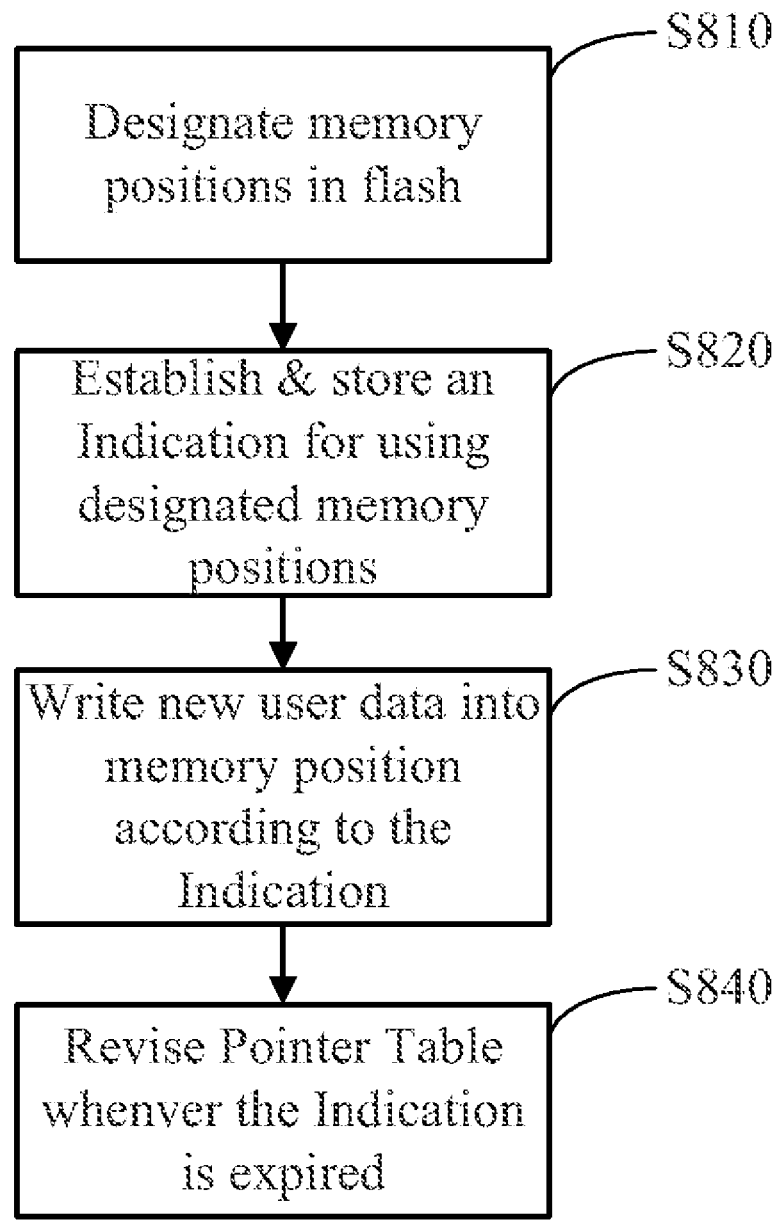
FIG. 8 is a flow chart of an updating method in accordance with the second embodiment of the present invention.

FIG. 8 is a flow chart of an updating method in accordance with the second embodiment of the present invention. As mentioned, at least one update area is designated in the flash memory. That is, some memory positions are defined as designated memory positions (step S810). In step S820, the indication for using the designated memory positions is established and stored. It is also possible to establish the indication and store the same first, and then the memory positions are designated according to the indication. Alternatively, steps S810 and S820 can be done in parallel. That is, there is no specific sequence between steps S810 and S820. When the user data of a logical address is updated, the new user data as well as the logical address thereof are written to the designated memory position according to the indication (step S830). It is noted that the logical address is also recorded with the new user data. Accordingly, it can be known that the new user data belongs to which logical address.

In addition to the knowledge indicating which memory positions of the flash memory are designated to store the updated user data, the indication also records a predetermined sequence for using the designated memory positions. For example, if there are twenty designated memory positions, the sequence may instruct to store the first updated user data into the first designated memory position, the second updated user data into the second designated memory position. The rest can be deduced accordingly. The sequence is unrelated with the logical addresses. Such a sequence may be set or adjusted according to the conditions of the flash memory or based on a status bit recorded in firmware of the system. The status bit indicates the processing or completion of an operation such as programming or erasing by toggling or poling bit.

If a power failure occurs, it is very easy to recover the user data by referring to the indication. The memory position where the latest user data for a logical address is written can be easily traced from the indication.

In the present embodiment, the indication is set for a pre-determined period of time. When the indication is expired, a pointer table stored in the flash memory is revised according to the indication (step S840). The system periodically checks the designated memory positions known from the indication, and revises the pointer table if the system finds designated memory positions have been used to store updated user data. Then, a new indication is provided.

Figure 9:
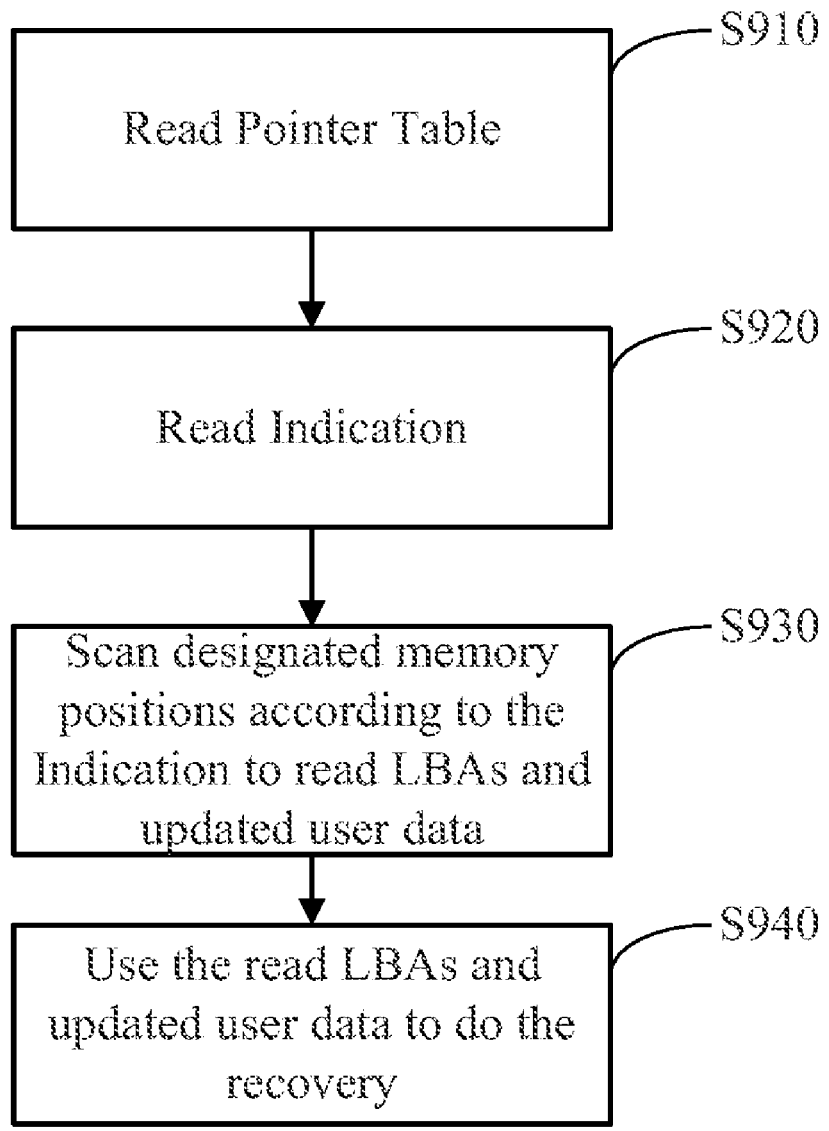
FIG. 9 is a flow chart of a recovering method in accordance with the second embodiment of the present invention.

FIG. 9 is a flow chart of a recovering method in accordance with the second embodiment of the present invention. If a power failure occurs, after re-powered on, to recover the user data for the first flash memory, the system reads the pointer table from the first flash memory (step S910). The pointer table can be written to a volatile memory such as a DRAM. The system reads the indication from the modification area in step S920. It is also possible to read the indication first, and then the pointer table is written to the DRAM. Alternatively, steps S910 and S920 can be executed in parallel. That is, there is no specific sequence between steps S910 and S920. In step S930, the system scans the update area(s) (i.e. scans the designated memory positions) according to the predetermined sequence recorded in the indication so as to read the logical addresses and the updated user data stored in the designated memory positions. In step S940, the system reads the user data in the flash memory according to the logical addresses and the updated user data.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A method for updating user data, the user data being associated with a plurality of logical addresses and a plurality of physical addresses of a first non-volatile memory, a pointer table recording a plurality of mapping relationships between the logical addresses and the physical addresses being stored in the first non-volatile memory, the method comprising:
    writing new user data for a logical address to a memory position in the first non-volatile memory when original user data of the logical address is updated into the new user data, wherein the memory position is denoted by a new physical address;
    establishing an indication other than the point table in a modification area of a second non-volatile memory, the indication indicating a mapping relationship between the logical address and the new physical address; and
    revising the pointer table based on the indication when the modification area storing the indication is full.

2. The method of claim 1, wherein the new user data of the logical address is written into the memory position denoted by the new physical address first, and then the indication is established.

3. The method of claim 1, wherein the indication is established first, and then the new user data of the logical address is written into the memory position denoted by the new physical address.

4. The method of claim 1, wherein writing the new user data of the logical address into the memory position denoted by the new physical address is executed in parallel with establishing the indication.

5. The method of claim 1, further comprising cleaning the modification area after the revising step.

* * * * *